Patented July 26, 1927.

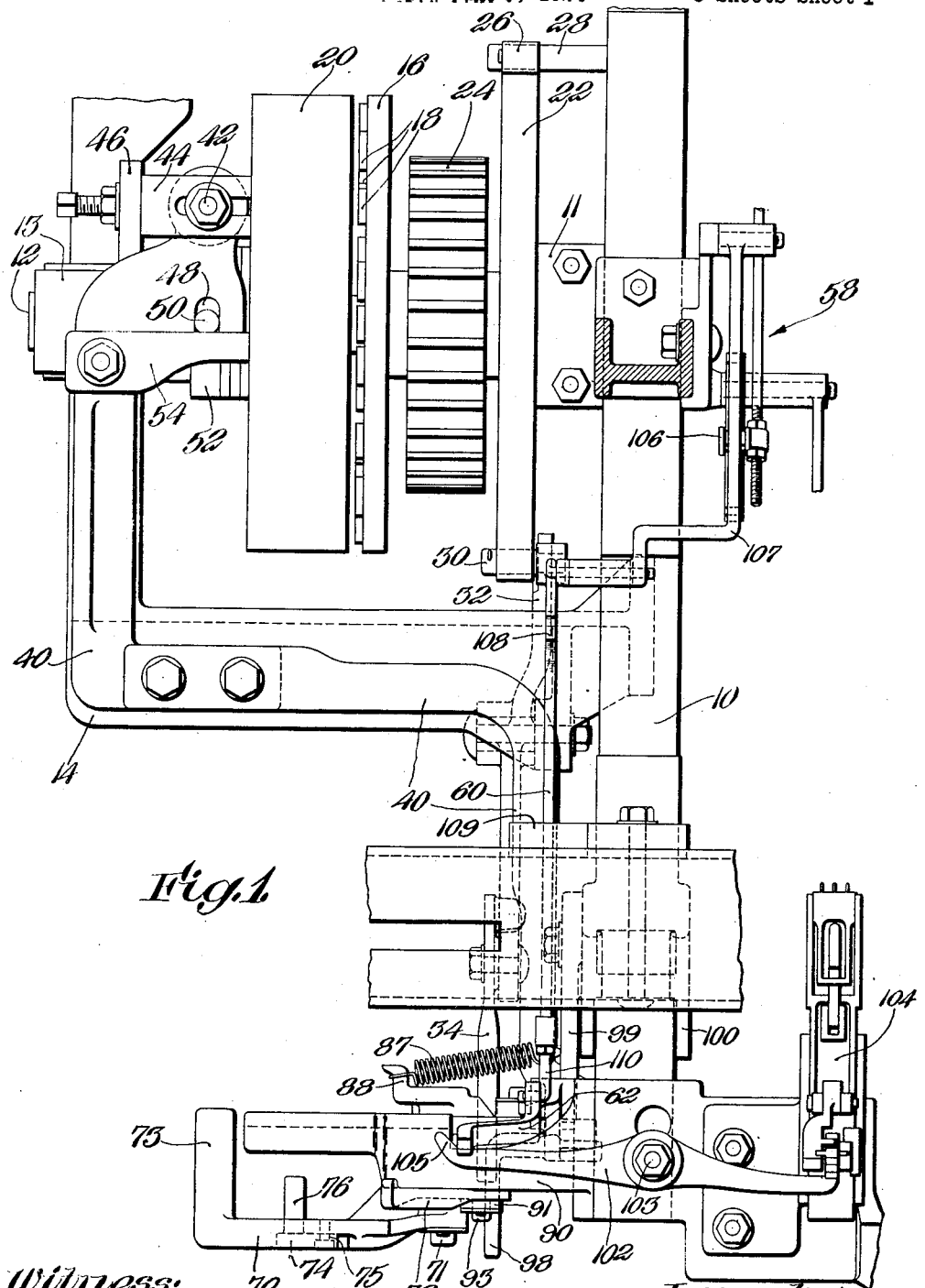

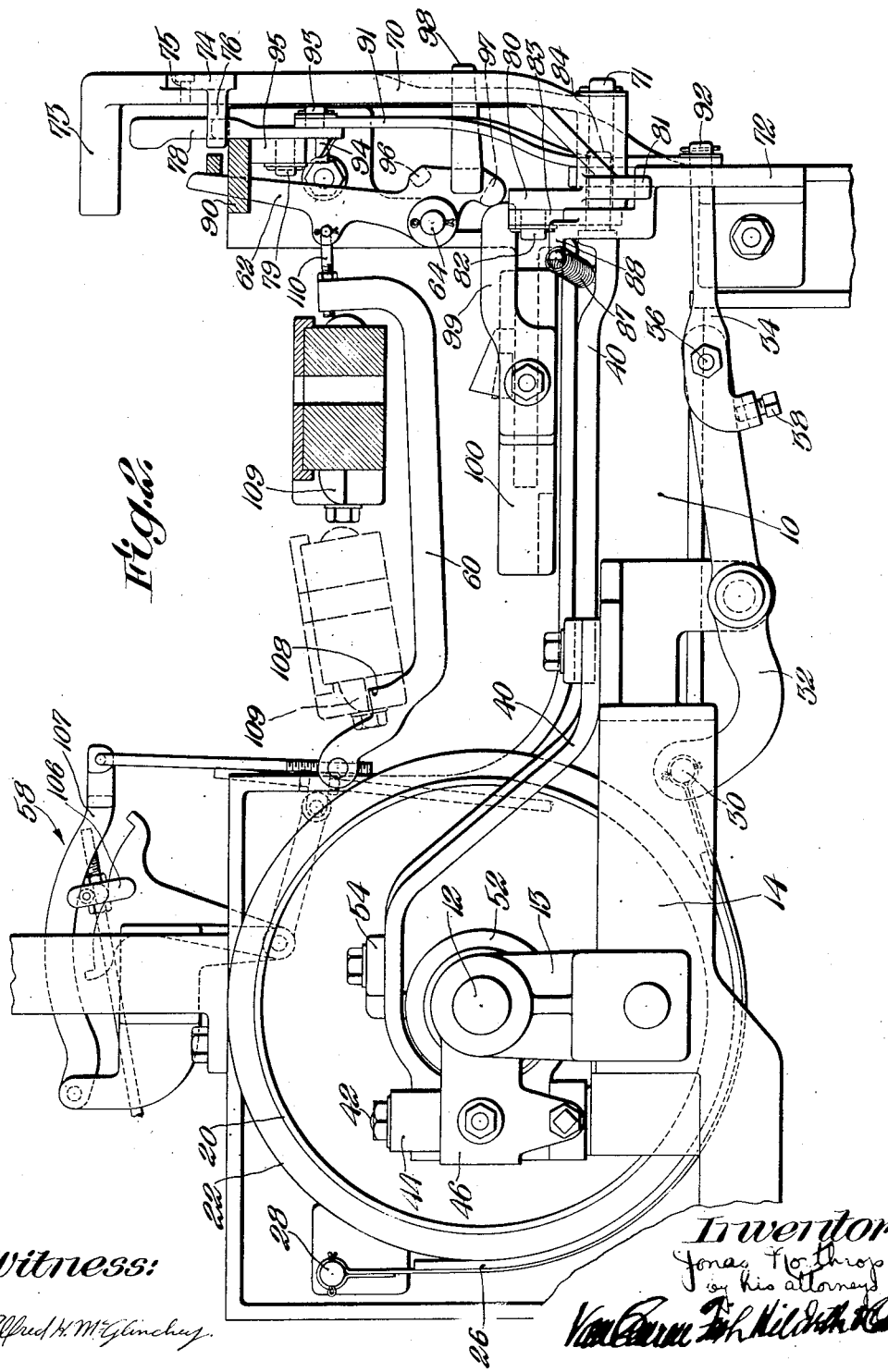

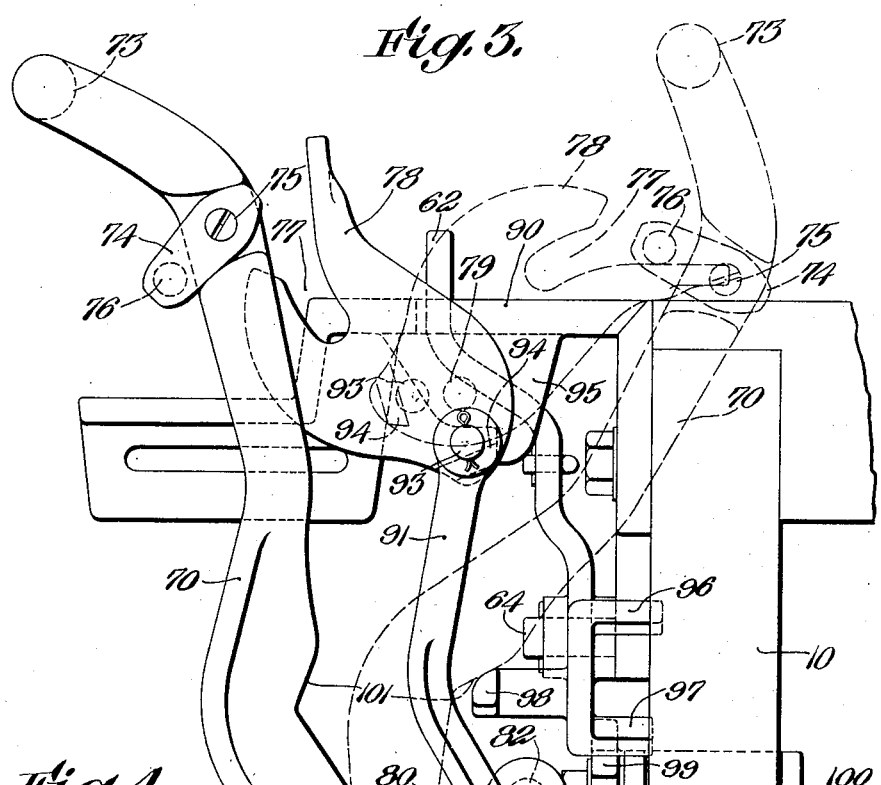
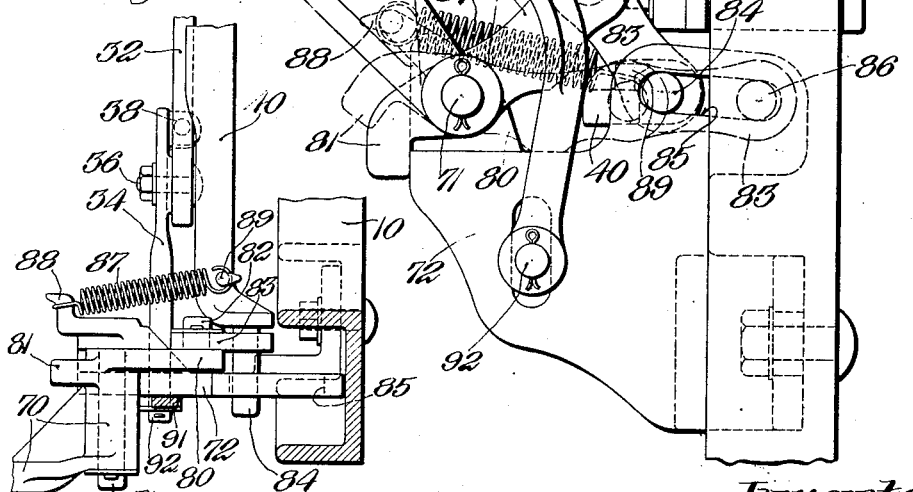

1,636,703

UNITED STATES PATENT OFFICE.

JONAS NORTHROP, OF HOPEDALE, MASSACHUSETTS, ASSIGNOR TO HOPEDALE MANUFACTURING COMPANY, OF MILFORD, MASSACHUSETTS, A CORPORATION OF MASSACHUSETTS.

CLUTCH MECHANISM FOR LOOMS.

Application filed June 3, 1924. Serial No. 717,540.

The present invention relates to an improvement in clutch mechanism for looms.

The object of the invention is to reorganize and improve the clutch mechanism for looms, more particularly the mechanism for starting and stopping the loom. To the above ends the present invention consists in the clutch mechanism for looms hereinafter described and particularly defined in the claims.

In the accompanying drawings illustrating the preferred form of the invention, Fig. 1 is a plan of a portion of one end of a loom, showing the improved mechanism for starting and stopping the loom; Fig. 2 is an end elevation of the portion shown in Fig. 1; Fig. 3 is a front elevation of the mechanism, the parts in the rear of the front being omitted; and Fig. 4 is a detail hereinafter referred to.

The illustrated embodiment of the invention is described as follows: The end frame 10 of the loom is of the usual construction, having a bearing 11 in which the crank shaft or lay shaft 12 is journaled. The outer end of the lay shaft 12 is supported in an outboard bearing 13, secured to and supported by a bracket 14 bolted to the end frame 10, and supported upon an auxiliary foot, not shown. A clutch disk 16 is keyed or otherwise secured to the lay shaft 12 to rotate therewith, and is provided on its outer surface with a plurality of friction disks 18, preferably of cork, and arranged in double rows. A loose pulley 20 is adapted to be driven by a belt, not shown, and provision is made for moving the loose pulley 20 axially of the lay shaft 12 into engagement with the friction disks 18 upon the surface of the disk 16 in order to transmit power from the pulley 20 to the lay shaft 12. The lay shaft is provided with a brake disk 22. Between the brake disk 22 and the driving disk 16 is supported the usual driving gear 24 by which the crank shaft 12 is driven from the driving shaft pulley.

A brake strap 26 secured at one end to the pin 28 secured to the frame of the machine and at the other end to the pin 30 secured in the end of a brake lever 32, provides means for applying a brake to the loom when it is stopped. The brake lever 32 has an adjustable portion 34 pivoted to the brake lever proper at 36 and adjusted with respect thereto by the adjusting screw 38.

The movement of the loose pulley 20 toward and from the driving disk 16 is accomplished by means of the clutch lever 40, which is pivoted at 42 to the bracket 44, which latter is adjustably mounted on an upright 46 secured to the bracket 14. At the rear end of the clutch lever 40 it is provided with a slot 48 which engages a pin 50 mounted in the disk 52, loosely supported upon the crank shaft 12. When the forward end of the clutch lever 40 is moved to the right, the clutch is closed, and when it is moved to the left, the clutch is opened. The loose disk 52 is held from rotation by the arm pin 50. The pulley is positively pulled away from the clutch link by the arm 54, the end of which engages a groove in the hub of the pulley 20.

The warp stop motion is indicated in a general way by the reference character 58. It is provided with a warp stop link 60, which is connected at its forward end to the trip lever 62 pivoted at 64 on the frame of the loom, and which is adapted to cooperate with the shipper lever to knock off the loom when failure of warp is indicated by the warp stop mechanism 58.

The shipper lever 70 is pivoted at 71 on a pin carried by the bracket 72 secured to the loom frame. The shipper lever 70 has a handle 73 and it carries a by-pass pawl 74 pivoted at 75 on the lever. This by-pass pawl carries a pin 76 which projects rearwardly from the shipper lever and is adapted to engage the mouth 77 of the alligator head 78.

The lower end of the shipper lever has integrally therewith an arm 80, projecting to the right, as viewed in Fig. 3, and a second arm 81. The former arm 80 is a toggle arm, and is articulated at 82 with the toggle link 83, carrying in its remote end the pin 84, which is supported and moved back and forth in a slot 85 in the bracket 72. This pin 84 is the front end of the clutch lever 40. When the shipper lever, therefore, is moved to the right, the toggle formed by the arm 80 and the link 83 is forced to the right to the position shown at 86, and this motion of the front end of the clutch lever, therefore, causes the clutch to be closed. The other arm 81 above referred to, mounted on the shipper lever 70, is a stop lever and engages the edge of the bracket 72 when the lever occupies its off position, as shown in Fig.

3. A spring 87 is connected at its left hand end to a hook 88 which is rigidly supported on the bracket 72 and at its right hand end to the hook 89 formed on or secured to the clutch lever 40. When the shipper lever is swung to the right to the broken line position shown in Fig. 3, this spring 87 is distended; when the shipper lever is thrown to the left, the spring contracts and tends to facilitate the breaking of the shipper toggle comprised by the toggle arm 80 and the link 83, and to cause the forward end of the clutch lever 40 to be moved to the left in the position shown in full lines in Fig. 3. The alligator head 78 is pivoted at 79 on the bracket 90 secured to the loom frame. When the shipper is swung to the right, the pin 76 on the by-pass pawl 74 enters the mouth 77 of the alligator head and turns the alligator head upon its pivot. This operates to release the brake link 91 connected at its lower end to the pin 92 formed on the front end of the adjustable piece 34 of the brake lever 32. The upper end of the brake link 91 is pivoted at 93 to the alligator head. In the position shown in Fig. 3 it will be noticed that the pin 93 is slightly to the right of the line joining the center of the alligator head pivot 79 and the pin 92, so that the brake lever is locked in that position. As soon, however, as the alligator head is turned slightly to the right, the toggle formed by the brake link 91 and the relative position of the pivot 79 and pin 93 of the alligator head is broken, and the brake is thereby released by the removal of pressure downward on the brake link 91. The alligator head swings from the position shown in full lines in Fig. 3 to the position shown in broken lines in that figure during the movement of the shipper lever from off to on position, and when in on position, as shown in broken lines in Fig. 3, the brake is entirely removed.

On the rear side of the alligator head there is provided a rearwardly extended abutment 94 which, when the alligator head occupies the position illustrated in full lines in Fig. 3, that is, brake applied position, constitutes an abutment which takes against a portion of a depending web 95 which is extended downwardly from the upper portion of the bracket 90, and by engagement with the projection 94 forms a stop which limits the movement of the alligator head toward the left of that in which it is illustrated in Fig. 3, so that when the brake is applied, the brake toggle above referred to is in straightened position and holds the brake strap tight on the brake disk. The shipper lever has a throw such that it begins to straighten the clutch applying toggle before the brake is released; that is to say, the shipper lever moves from the position illustrated in full lines in Fig. 3 until the pin 76 on the by-pass pawl 74 strikes the surface of the alligator mouth before the latter releases the brake. Also, after the brake is released the shipper lever has a further throw to the position shown in Fig. 3, beyond that necessary to move the alligator head to the off position shown in broken lines in that figure. Thus, when the shipper lever first moves it initiates the closing movement of the clutch and then releases the brake completely, and afterward moves far enough to close the clutch and start the operation of the loom. In motion in the opposite direction the shipper lever moves a certain distance before it engages the alligator head so that the clutch is opened before the brake is applied, and the brake is entirely applied before the shipper lever completes its opening movement.

The trip lever 62 is provided with two lugs 96 and 97. It is also provided with an arm 98. The lug 96 projects to the right, as viewed in Fig. 3, and is adapted to engage a portion of the frame of the loom to form a stop to limit the rearward movement of the trip lever. The lower lug 97 is adapted to be engaged by the forward end of an arm 99 bolted to the frog 100. The arm 98 of the trip lever projects forward and underlies the cam surface 101 on the right hand side of the shipper lever, as viewed in Fig. 3. When the trip lever is moved rearwardly, it raises the forward end of the arm 98, and thereby trips the shipper lever, the motion of which thus begun is completed by the contraction of the trip lever spring 87. The trip lever, it will be observed, is adapted to be actuated both by the warp stop motion through the link 60, and by the forward movement of the frog 100, actuated by the protector mechanism, and in addition it is adapted to be actuated by a third means, namely the knock off lever 102, pivoted at 103 on the loom frame, having its left hand end extended over in front of the upper end of the trip lever 62, so that when the misthreading device, indicated in a general way by the reference character 104, operates to force forwardly the misthreading device slide, it actuates the trip lever to stop the loom.

The left hand end of the knock-off lever 102 is provided with a rearwardly projected cam 105. When the knock-off lever 102 is turned by the forward movement of the weft stopping means (which, in the illustrated embodiment is the misthreading device and associated parts) the cam 105 moves rearwardly on the arc of a circle, and therefore moves not only rearwardly, but also to the right, as viewed in Fig. 1, and this motion causes the cam to accelerate the movement imparted by the knock-off lever to the trip lever 62 which, in turn, throws the shipper lever to stop the loom and apply the brake.

The cam acts, therefore, to accelerate the tripping of the shipper lever.

An important feature of the construction in which the invention is preferably embodied resides in the timing of the stopping. When the loom is stopped by warp failure, the indication of warp breakage arrests the movement of the block 106 and thereby causes the lever 107 to be raised. This lifts the link 60 and presents the shoulder 108 of such link to the striker 109 mounted on the rear of the lay. It will be seen that during the latter part of the rearward movement of the lay this striker engages the shoulder and causes the trip lever, through the means heretofore described, to actuate the shipper lever to move it from broken line position to full line position, as shown in Fig. 3. The timing is such that the loom will be stopped on warp failure with the lay between bottom center and front center, and at a time when the harnesses are level. By adjustment of the stud 110 which connects the link 60 with the trip lever 62, a variation in the time of stopping the loom may be secured. Thus, by moving 60 to the left, that is, increasing the distance between the front end of the link 60 and the trip lever 62, the loom will be stopped later; by shortening the distance between the link 60 and the trip lever 110 the stopping of the loom will be accomplished earlier. Nice adjustment of this time of stopping will secure the accurate stopping of the loom with the harnesses level, so that the loom is in condition to piece the warp without any hand turning.

Similarly, when the loom is knocked off by the misthreading device, the weft hammer which actuates it will move the misthreading device slide rearwardly at such time that the knock-off lever 102 will actuate the trip lever at the proper time to stop the loom on the back center. The weft hammer is so timed with respect to the misthreading device that it catches the tail of the fork just after the front center, and the operations incident to stopping are completed by the time the lay has got to back center. This accomplishes the stopping of the loom with the shed open and with the shuttle in one of its boxes, so that the shuttle may be easily taken out of the box, and no necessity arises for the hand turning over of the loom in order to adjust the position of the parts preparatory for starting.

In order to convenience the loom operative, it will be observed that when the loom is stopped the shipper lever and brake applying contrivance occupy the position indicated in Fig. 3. Sometimes the operative will desire to release the brake so that the loom may be turned over by hand for the purpose of making various adjustments in preparation for weaving or to restore adjustments accidentally discommoded during operation. To this end the operator may take hold of the upper jaw of the alligator head and swing the head from the position shown in full lines to the position shown in broken lines in Fig. 3, thereby releasing the brake and permitting the loom to be turned over by hand without the resistance of the brake. It will not be necessary in such case to restore the brake before starting the loom because when the shipper is thrown to the right from the position shown in full lines in Fig. 3, the by-pass pawl 74 will ride over the surface of the lower jaw of the alligator head, which latter will occupy the broken line position under such circumstances. So the loom would be started by throwing the shipper without any attention to the fact that the brake is at the time released. Upon throwing the shipper to stop the loom, the by-pass pawl engages the alligator mouth in the regular way.

It is to be understood that the invention may be embodied in other forms within the scope of the following claims.

Having thus described the invention, what is claimed is:

1. A loom having, in combination, a frame, a crank shaft, a driving pulley, a friction clutch connecting the driving pulley to the shaft, a clutch lever, a toggle mechanism for operating the clutch lever to close the clutch and lock and hold it closed.

2. A loom having, in combination, a frame, a crank shaft, a driving pulley on the shaft, a friction clutch on the shaft connecting the driving pulley to the shaft, a brake disk on the shaft, a clutch lever for closing and opening the clutch, a brake for applying braking friction to the brake disk, a lever for operating the brake, connections between the shipper lever and the clutch lever having a toggle contrivance, and connections between the shipper lever and the brake operating device acting to lock the brake by toggle action when the shipper lever is moved to open the clutch.

3. A loom having, in combination, a frame, a crank shaft, a driving pulley on the crank shaft, a friction clutch for connecting the driving pulley to the shaft, a brake disk on the shaft, a brake for the brake disk, operating means for the brake comprising a toggle, a shipper lever for operating the clutch, and connections between the shipper lever and the brake toggle to straighten the toggle when the shipper lever is thrown to open position, and to release the brake toggle when the shipper lever is thrown to closed position.

4. A loom having, in combination, a frame, a crank shaft provided with a driving pulley, friction clutch and braking means, levers for operating the clutch and braking means, and a trip lever having a portion adapted to engage a cam surface on the shipper lever to move the latter from closed position so as to break the clutch toggle.

5. A loom having, in combination, a frame, a crank shaft, a driving pulley provided with a friction clutch and braking means, a shipper lever, a toggle connected therewith for operating the clutch, a brake lever, a toggle connected therewith for operating the brake, the brake toggle being straightened when the shipper lever is moved to off position.

6. A loom having, in combination, operating means comprising a clutch and brake, a shipper lever for actuating the clutch, a toggle contrivance for actuating the brake, the shipper lever being provided with a by-pass pawl, and the brake toggle being provided with a member adapted to be engaged by the by-pass pawl to break the brake toggle when the shipper lever is actuated to close the clutch and start the loom, and adapted to ride over the toggle member of the brake actuating device when the brake is in released position when the loom is to be started.

7. A loom having, in combination, a driving shaft, clutch and brake mechanism on the driving shaft, clutch and brake levers for operating the clutch and brake, a shipper lever directly connected with the clutch lever, a brake toggle mechanism including an alligator head provided with a mouth, the shipper lever being provided with a by-pass pawl having a pin adapted to enter the alligator head mouth when the brake is in on position and the shipper lever is in off position, upon movement of the latter from open to closed position, and to pass freely over the alligator head when the latter is in off position when the shipper lever is to be moved from open to closed position.

8. A loom having, in combination, a frame, a rotary member by which the loom is driven, braking means including a brake actuating device having a toggle for applying and holding the braking means in brake applied position.

9. A loom having, in combination, a frame, a crank shaft, driving means for the shaft, a brake disk in the shaft, a brake for the brake disk, operating means for the brake comprising a toggle, a shipper lever for throwing the driving means into and out of operation, and connections between the shipper lever and the brake toggle to straighten the toggle when the shipper lever is thrown to open position, and to release said toggle when the shipper lever is thrown to closed position.

In testimony whereof I have signed my name to this specification.

JONAS NORTHROP.